United States Patent [19]

Gatten

[11] Patent Number: 4,970,527

[45] Date of Patent: Nov. 13, 1990

[54] PRIMING METHOD FOR INKJET PRINTERS

[75] Inventor: Ronald A. Gatten, Pleasanton, Calif.

[73] Assignee: Spectra-Physics, Incorporated, San Jose, Calif.

[21] Appl. No.: 279,395

[22] Filed: Dec. 2, 1988

[51] Int. Cl.$^5$ .............................................. G01D 15/8

[52] U.S. Cl. ...................................... 346/1.1; 346/75; 346/140 R

[58] Field of Search ...................... 346/1.1, 75, 140 R

[56] References Cited

U.S. PATENT DOCUMENTS 4,417,256 11/1983 Fillmore et al. ..................... 346/75

4,540,997 9/1985 Biggs et al. .................... 346/140 R

*Primary Examiner*—George H. Miller, Jr.

*Assistant Examiner*—Gerald E. Preston

*Attorney, Agent, or Firm*—Skjerven, Morrill, MacPherson, Frnaklin & Friel

[57] ABSTRACT

A program installed in the microcontroller of an ink jet printer functions as a timer, to keep track of how much time has elapsed since the ink jet cartridge last printed. After a certain amount of time (such as one hour) has elapsed with no printing, the program directs all the nozzles of the cartridge to each print about twenty ink dots. This periodic priming of the nozzles during idle periods prevents viscous ink plugs from building up in and clogging the nozzles.

18 Claims, 7 Drawing Sheets

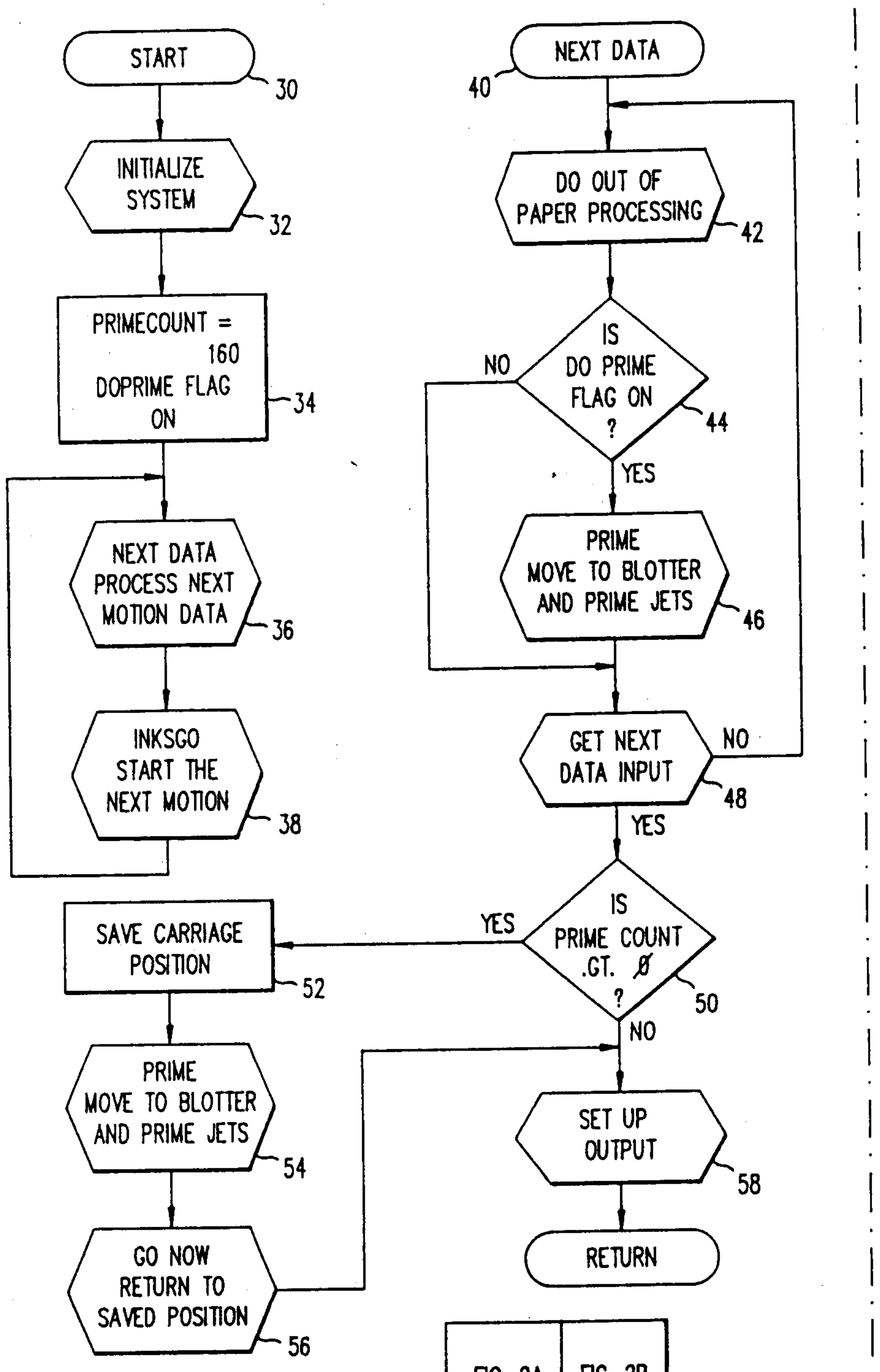
*FIG. 2A*
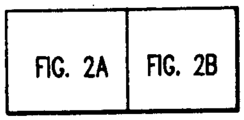

```
;**********************************************************************
;Data Flow Timer Interupt
;Purpose: High count on data delay 64 mSec overflow timer
;          When the data flow timer overflows every 64 mSec, the
;       software counter DATAHITIME is incremented.  At 512 mSec,
;       the Clear Carriage flag is set to trigger motion of the
;       print head out of the viewing path.  At about 17 seconds, the
;       motor currents are reduced to minimum level.  At about 3
;       minutes, the ink prime counter PRIMECOUNT is incremented, and
;       DATAHITIME is reset to zero.  If PRIMECOUNT is equal to 2Ø,
;       then the DOPRIME flag is set to trigger an automatic priming
;       of the ink jets.
;**********************************************************************
DATHTLIM:
;**********************************************************************
          The Data Timer is checked here for a value of 3 minutes
;**********************************************************************
DATHL3:
        CJNE    A,#LOW 2812,DATHL4
        MOV     A,DATAHITIME     ;If Data High Time .eq. 3 Minutes
        CJNE    A,#HIGH 2812,DATHL4
;**********************************************************************
          If equal to 3 minutes, the timer is reset
;**********************************************************************
        MOV     DATAHITIME,#Ø    ;Then, Zero Data High Time
        MOV     DATAHITIME+1,#Ø
;**********************************************************************
          Prime Count Is Incremented
;**********************************************************************
        INC     PRIMECOUNT       ;And Increment Prime Count
;**********************************************************************
          If Prime Count Greater or Equal to 2Ø, the set Do Prime
;**********************************************************************
        MOV     A,PRIMECOUNT     ;If Primecount .ge. 2Ø (1 Hour)
        ADD     A,#-2Ø
        JNC     DATHL4
        SETB    DOPRIME          ;Then, Set Do Prime Flag
DATHL4:
        POP     PSW              ;Restore Flags, ACC
        POP     ACC
        RETI                     ;And Return From Interrupt
;**********************************************************************
NOTE:  Time is reset to zero whenever there is data input to  the
     printer
;**********************************************************************
```

FIG. 3A

```
;*****************************************************************
PRIME:
;Purpose: Go to Blotter And Prime Ink Jets
;         Save Next Print Head Position on the stack.  Move
;      print head to the blotter with ink off.  Set up to run at
;      1250 firings per second.  Loop for PRIMECOUNT times, firing
;      all 12 dots and adding to the dot count.  Retrieve Next
;      Print Head Position and go there.
;Called by: NEXTDATA
;Subroutines Called: NEEQTA,FORCEGO,SETWAIT,ADDDOTS
;Input Variables: PRIMECOUNT,ET0-flag
;Changed Variables: NEXTX,NEXTY,RAMP,RAMPLIM,STEPTIME,PRIMECOUNT,
;                   NEXTDOTS,Flags(NEXTPEN,ET0,)
;*****************************************************************
        CLR     NEXTPEN            ;Turn Pen Off
        CALL    NEEQTA             ;Next X = X Target
        MOV     NEXTY,#HIGH BLOTTER ;Go to Blotter Position
        MOV     NEXTY+1,#LOW BLOTTER
        CALL    FORCEGO            ;Force Look Ahead To Target And Go
        CALL    WAIT               ;Wait Until Target Reached
        CLR     A                  ;Ramp = 0
        MOV     RAMP,A
        MOV     RAMPLIM,A          ;Ramplim = 0
        MOV     STEPTIME,#-1       ;Step Time = INTDELAY - Dot Time
        MOV     STEPTIME+1,#HIGH (INTDELAY-DOTTIME) ;
        MOV     STEPTIME+2,#LOW (INTDELAY-DOTTIME) ;
PRIME2:
        MOV     A,PRIMECOUNT
        JZ      PRIME4
        DEC     PRIMECOUNT
        MOV     NEXTDOTS,#0FFH     ;NEXTDOTS = 0FFFFh
        MOV     NEXTDOTS+1,#0FFH   ;For All Dots On
        MOV     A,#12              ;12 Dots
        CALL    ADDDOTS            ;Add to Dot Count
        SETB    ET0                ;Enable Step Timer Interrupt
        SETB    XBUSY              ;Set X Busy Flag
PRIME3:
        JB      XBUSY,PRIME3       ;Wait Till Disabled
        JMP     PRIME2
PRIME4:
        CLR     DOPRIME            ;Clear The Do Prime Flag
        CLR     PRWAIT             ;Turn Off Printer Wait Flag
        RET                        ;And Return
```

FIG. 3B

```
;*********************************************************************
NEXTDATA:
;Purpose: Get Data From Buffer and Translate for next data segment
;           This routine gets data from the data buffer and
;       translates it to NEXTX, NEXTY, NEXTPEN, PLFLAG, and CHAR.
;       It also handles special functions related to Out of Paper
;       control, inkjet priming, and clear view of text when print
;       head stops moving.
;           If out of paper, the routine processes Line Feed
;       characters and Vertical Tab characters to a Line Feed or
;       reverse Line Feed.  If the out of paper done flag OOPSDONE
;       is set it will clear up the flags to exit out of paper mode,
;       go to the top of form, and if SAVEFLAG is on, it will call
;       CONTPLOT to continue plotting the incomplete line segment
;       from before running out of paper.
;           The plot flag PLFLAG is updated, R0 is set to BUF_OUT
;       the buffer output pointer, and PREBUF is called to get the
;       next data segment from the buffer and to interpret it.
;           If there is not an internal print message, if this is
;       a print self-test, and if there is no data in buffer, and if
;       the CLRCAR clear carriage flag is off, then loop back to
;       start of NEXTDATA.
;           If CLRCAR is set, then use procedure PUTCARRIAGE to
;       move the carriage to the right, wait for data in the buffer,
;       then move the carriage back to the left and continue
;       processing data.
;           Transitions between printing and plotting mode adjust
;       the location of printing and plotting dots by calling the
;       routine DOT_ADJ which puts an offset in DOT_SHIFT to be
;       adjusted in BACKLASH.
;Called by: Mainline Loop following START
;Subroutines Called: KICKZ80,DOLF,DORLF,NEEQTA,WAITNGO,CONTPLOT,
;                    PREBUF,PUTCARRIAGE,PRIME,CONTPLOT,TEST,
;                    TESTDONE,DOETX,DOT_ADJ
;Input Variables: RAMP,NEXTX,NEXTY,CHAR,BUF_OUT,PRIMECOUNT,TESTFL,
;                 BUFMARGIN,Flags(OOPSTAT,XMOTION,PAPREQUEST,
;                 DOPRIME,PMESSAGE,NPLFLAG,LOADPAPER,OOPSDONE,
;                 SAVEFLAG,PMESSAGE,PRTEST,CLRCAR,SAVEFLAG,
;                 QUITTEST,BFFLAG,PLFLAG)
;Changed Variables: NEXTX,NEXTY,PLFLAG,BUF_OUT,BUFMARGIN,
;                   Flags(PAPREQUEST,LOADPAPER,OOPSDONE,BFFLAG,
;                   NEXTPEN)
;*********************************************************************
```

FIG. 3C

```
;*******************************************************************
        Out of Paper process code goes here
;*******************************************************************
        If Do Prime Flag is on, then Call PRIME
;*******************************************************************
        JNB     DOPRIME,NEXTD5   ;If Do Prime Flag
        CALL    PRIME            ;Then Prime
;*******************************************************************
        Get Next Data Here
;*******************************************************************
        If Prime Count is not equal to zero
;*******************************************************************
        MOV     A,PRIMECOUNT     ;If Primecount .ne. 0
        JZ      NEXTD14
;*******************************************************************
        Then, restore next plot flag
;*******************************************************************
        MOV     C,SNPLFLAG       ;Carry = Saved Next Plot Flag
        MOV     NPLFLAG,C        ;Next Plot Flag = Carry
;*******************************************************************
        Save Next Y and Y Target on the Stack
;*******************************************************************
        PUSH    NEXTY            ;Save Next Y on Stack
        PUSH    NEXTY+1          ;
        PUSH    YTARG            ;Save Y Target on Stack
        PUSH    YTARG+1
;*******************************************************************
        Move to the blotter and prime the cartridge
;*******************************************************************
        CALL    PRIME            ;Then Prime
;*******************************************************************
        Move back to the target position
;*******************************************************************
        POP     NEXTY+1          ;Get Target in Next Y From Stack
        POP     NEXTY            ;
        CALL    FORCEGO          ;Go Back to To Target
;*******************************************************************
        Restore Next Y
;*******************************************************************
        POP     NEXTY+1          ;Get Next Y From Stack
        POP     NEXTY            ;
;*******************************************************************
        And do remainder of Next Data Set Up
;*******************************************************************
NEXTD14:
```

FIG. 3D

PRIMING METHOD FOR INKJET PRINTERS

BACKGROUND OF THE INVENTION

1. Field of the Invention

This invention relates to ink jet printers, and to a method of operating ink jet printers.

2. Description of the Prior Art

Ink jet printers are well known in the art. A typical such printer 10 is shown in FIG. 1. Hewlett Packard manufactures the Hewlett Packard thermal Ink-jet print cartridge 12, which may be used as the printing component of the printer 10. The Hewlett Packard thermal Ink-jet cartridge 12, well known in the art, is a self-contained disposable printhead suitable for a wide variety of dot matrix printing and plotting on a medium such as paper 13. The cartridge 12 includes a pressure contact electrical interconnect for ease of replacement, and can be used in any orientation.

Ink capacity of over ten million dots (dots are the ink drops ejected by the cartridge so as to print on the medium) gives the twelve nozzles 14 etc. of the thermal ink-jet cartridge 12 the capacity of typically 500,000 characters (depending on the font) or extensive graphics. The thermal ink-jet cartridge prints on a variety of papers (i.e., media) The non-contact operation allows variation in distance to the media when printing.

As is well known in the art, however, such ink jet cartridges as described above are subject to the problem of viscous plug formation. A viscous plug is a plug of ink in the exit portion of a print cartridge nozzle 14 in which evaporation of the liquid ink in the cartridge causes a thickening of the ink near the nozzle exit, interfering with ink dot ejection. This plug can occur when the print cartridge is idle (i.e., not firing) for a period of time, normally several days, depending on the ambient temperature and humidity conditions. The viscous plug can often be removed by printing. Plug formation is worst in hot and dry conditions but the plugs are most difficult to clear in cold and dry conditions. Plugs cause poorly formed dots or no dots at all and so degrade print quality.

The prior art (the *Thermal Ink-Jet Print Cartridge Designer's Guide,* Hewlett Packard, October, 1986) suggests that plugs which cannot be removed by firing (i.e., printing) will usually be cleared by holding a damp tissue in contact with the nozzles for several seconds and then gently wiping.

The same *Designer's Guide* also suggests that (page 10)

> To insure immediate printing after an idle period, it is suggested that the following prefiring algorithm be used:
>
> After not printing (idle), and just before printing, fire all 12 nozzles several times; 1 firing for every 3 minutes of idle time up to a maximum of 160 firings.
>
> Severe environments or specific applications may require more extreme measures. Some possibilities to try include:
>
> 1. Increase the number of prefires.
> 2. Decrease the maximum idle time.
> 3. Increase the number of prefires at low temperatures.
> 4. Insure that prefiring is done at maximum specified frequency.
> 5. Control the temperature and humidity immediately around the print cartridge.
> 6. Use a dampened tissue to "soak" and then wipe the nozzles when prefiring fails to clear a plug.
> 7. "Cap" the print cartridge when not in use to maintain a closed humid environment around the nozzles.
> 8. Place the cartridge in a sealed container when not in use.

In the prior art, the printer 10 includes a blotter 16 located to the left of the left-most printing location 18. The printhead guide track 20 contains a ramp (not shown) to lift the cartridge 12 over the blotter 16. Upon system initialization, the cartridge 12 is moved to the blotter 16 and fires all nozzles 14 for 160 times in succession, to perform the prefiring algorithm.

The *Designer's Guide* also suggests during high temperature periods, replacing the cartridge 12 every one to two months.

It is also suggested, for use outside the specification limits, to provide a tray of water near the head to raise humidity, and removing the print cartridge when not in use and storing in a cool location. The *Designer's Guide* specifically says that (page 10):

> Periodic priming is not recommended for preventative maintenance. Only prime after a failure (see Maintenance Procedures).

A common application of ink jet printers is as a printer system for use with a personal computer such as is indicated at 20 which provides data to printer 10 on channel 21. Under these circumstances, the printer 10 is usually turned off when not in use for long periods of time, thus making any sort of periodic priming impossible. Automated periodic priming under power on conditions even where possible has the drawback in most personal computer applications that it might disconcert the operator, due to unanticipated movement of the print head during the priming operation.

SUMMARY OF THE INVENTION

The present invention is a method to prevent viscous plugs from clogging the nozzles of an ink jet print cartridge when the printer is idle (i.e., not printing). The method preferably involves using a microcontroller 22 (which is conventionally provided in many ink jet printers) as a timer to keep track of the amount of time that has elapsed since the print cartridge last printed. After a predetermined amount of time of such idleness, the microcontroller 22 directs the printer 10 to print one or more ink dots from each nozzle 14, thus priming all the nozzles. The preferred predetermined amount of time allowed to elapse is about one hour.

In the preferred embodiment of the invention, the microcontroller 22 includes a data timer which is restarted every time that data is input to the printer. If the timer ever reaches a count showing three minutes of inactivity, it is reset to zero and a prime count (PRIMECOUNT) in the microcontroller 22 is incremented. If the prime count reaches twenty (equal to one hour of idleness), means is established in the timer in the microcontroller 22 to so indicate; this is done by a flag (DOPRIME) which is set in the timer routine. When the flag is set, the printhead will move to the blotter location, fire (i.e., print) twenty times and is returned to its prior location and then PRIMECOUNT and DOPRIME are reset.

If data is input and PRIMECOUNT is nonzero (but less than twenty), then the printhead will move to the blotter, fire each nozzle for a number of times equal to PRIMECOUNT, reset PRIMECOUNT, and return to its previous position to output the data.

The priming of the print cartridge, in accordance with the preferred embodiment of the invention, is infrequent enough so that it uses only a small amount of the ink supply in the cartridge. This is so even if the cartridge sits idle for an extended period, such as a month, while periodically priming.

BRIEF DESCRIPTION OF THE DRAWINGS

FIGS. 2A and 2B compositely show one embodiment of the present invention in flowchart format.

FIGS. 3A, 3B, 3C, and 3D show the relevant portions of an assembly language program embodiment of the present invention.

DETAILED DESCRIPTION OF THE INVENTION

In accordance with the present invention, in the preferred embodiment an ink jet printer 10 similar to that of the prior art having an eight bit microcontroller 22 such as the Intel 8052 microcontroller (of the 8031 microcontroller family) has a program conventionally installed in microcontroller ROM (read only memory) 24 to control the printhead 12 via channel 26. The relevant portions of the program to control the printer 10 in accordance with the present invention are shown in assembly language as shown in FIGS. 3A, 3B, 3C, and 3D, including comments.

Figure 1:
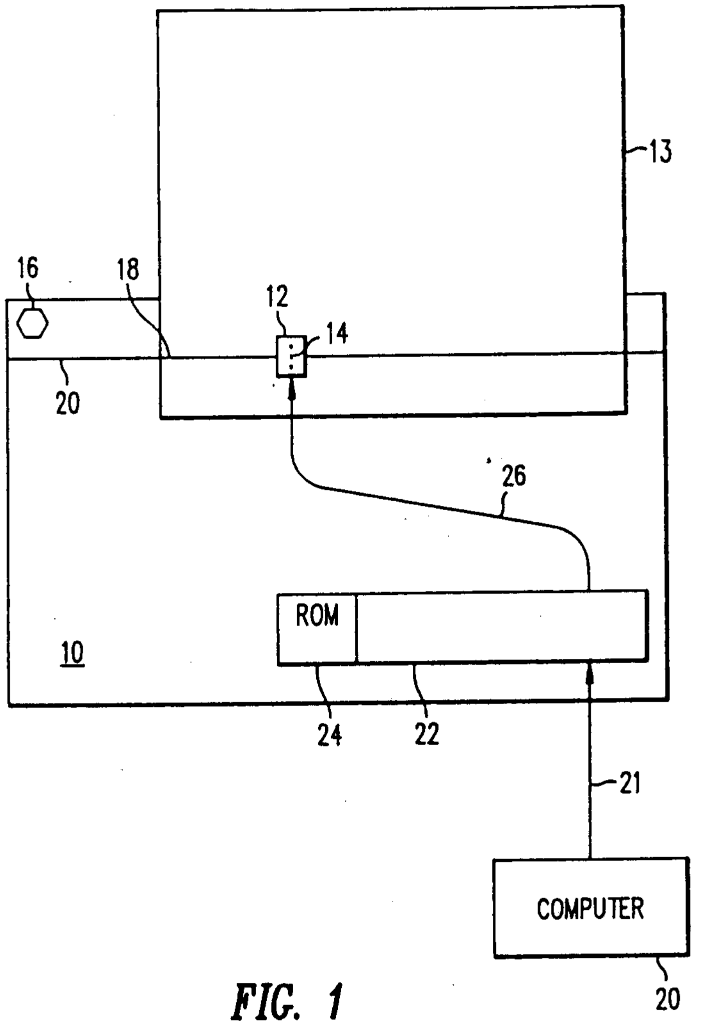
FIG. 1 (Prior Art)
FIG. 1 shows a typical printer system consistent with the prior art.

The present invention, in the preferred embodiment, requires that the printer be powered up (i.e., turned on) at all times, so that the microcontroller has power and so can function as a timer, and also so that the printer can periodically be primed by printing ink dots. Thus the preferred embodiment is perhaps most suitable for industrial or scientific applications where the printer is normally left on for long periods. Instrumentation other than a personal computer might be substituted for computer 20 shown in FIG. 1. The prevention of clogged nozzles is also of great importance in applications where the printer is being used as a printer-plotter to record real time events, and the printer output may constitute the only record of the events. In this case a failure of the cartridge due to clogged nozzles would result in a loss of all data.

Figure 2B:
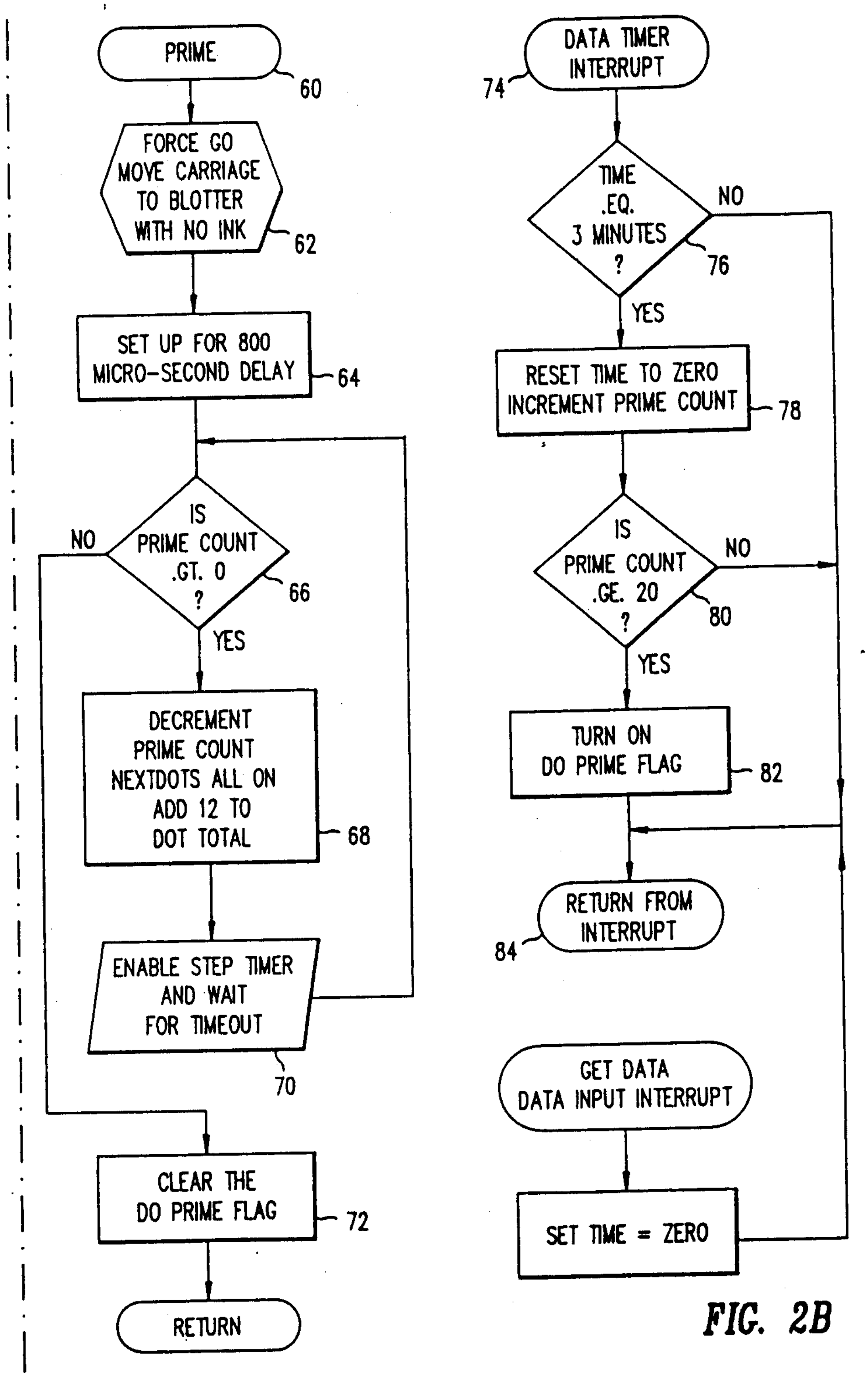

With reference to the flow chart shown in FIGS. 2A and 2B, one embodiment in accordance with the present invention operates as follows. The conventional prior art power-up sequence for the printer begins at START at 30, which is followed by the conventional System Initialization at 32, and then the prior art priming of the nozzles upon start-up by setting PRIMECOUNT to 160 (in one variation recommended by Hewlett Packard) at 34, followed by normal processing and plotting of data at 36, 38. The one difference in this sequence over the conventional printer control program is the introduction of the DOPRIME flag variable, which is turned on at 34.

The next column of the flowchart begins with the conventional NEXTDATA subroutine at 40,42, which gets data from the printer buffer and translates the data so as to print the next data segment. If the DOPRIME flag is on at 44, then the PRIME subroutine at 46 is called.

The PRIME subroutine at 46 actually directs the printhead to move to the blotter and to fire the nozzles to prime them as described below. The PRIME subroutine at 46 is repeated as long as the DOPRIME flag at 44 is on. After priming is completed, the next data is input conventionally at NEXTDATA at 48. If there is more data, the PRIMECOUNT variable is checked at 50. If PRIMECOUNT is greater than zero, the path to the left is taken and PRIME is called again at 54, after the carriage position is saved. After priming again at 54, the carriage is returned at 56 to the position saved at 52.

The purpose of the loop 50, 52, 54, 56 is that if data is output to the printer before one hour has elapsed, but after three minutes have elapsed, there will be a number in PRIMECOUNT at 50 of 1 to 19. Then the PRIME subroutine will be called at 54, and PRIME executes the number of cycles equal to the number in PRIMECOUNT.

If PRIMECOUNT is zero at 50, then conventionally the data is set up and output to be printed at 58.

The third column of the flowchart shows the details of the PRIME subroutine at 60. First, the carriage is moved over to the blotter position without any firing of the nozzles at 62. Then a delay time of 800$\mu$ seconds between nozzle firings is set up at 64. This is the reciprocal of the conventional 1250 firings per second. Then the PRIMECOUNT value is checked at 66. If the value is greater than zero, PRIMECOUNT is decremented by one and all twelve nozzles are fired once at 68. Then a step timer (for the priming cycle) is enabled at 70. This loop 66,68,70 is repeated for PRIMECOUNT number of times. After that, the loop is exited at 60 and the DOPRIME flag is cleared at 72. Then the carriage is returned to its prior position.

The last part of the flowchart shows the data timer (including subroutines DATHTLIM, DATHL3, and DATHL4), as implemented in the Data Timer Interrupt at 74. After a time equal to three minutes without data being input to the printer at 76, the prime counter PRIMECOUNT variable is incremented at 78 and the variable DATAHITIME, which times up to three minutes, is reset to zero at 78. When PRIMECOUNT reaches twenty (one hour) at 80, the DOPRIME flag is turned on at 82 which (as described above) causes priming followed by a return at 84. If the PRIMECOUNT is not yet 20, at 80, there is also a return at 84.

The assembly language program for the preferred embodiment of the invention thus adds subroutines and code to the conventional printer control program. As described above, the elements added to the conventional program include: (1) those which implement the date timer, subroutines DATHTLIM, DATHL3, and DATHL4; (2) that which implements priming, subroutine PRIME; (3) addition of the DOPRIME flag to system initialization; (4) modifications (so as to call PRIME and restore the carriage to its position after priming) to the conventional subroutine NEXTDATA as shown in FIGS. 3C, 3D.

The above description of the invention is illustrative and not limiting. Alternative embodiments include priming the nozzles by firing them onto the paper in the printer, if no blotter is available. Also, the time between primes need not be an hour; the time could be any convenient value, although thirty minutes to three hours is preferred. The number of priming firings for each nozzle could also be any convenient number. The method of the present invention is also applicable to an ink jet printer cartridge having only one nozzle. In another embodiment, instead of being controlled by means of the printer microcontroller, the priming operation could be wholly or partly under control of the computer or other instrumentation which is providing data to the printer.

In yet another embodiment, the priming operation takes place after a certain interval of inactivity by any of the nozzles, so if any one nozzle had been idle, all the nozzles would be primed after a certain amount of time.

I claim:

1. A method for priming an ink jet printer system having timing means for measuring elapsed time, a cartridge with at least one nozzle for printing dots, and control means for controlling the cartridge by means of a printing command, comprising the steps of:

maintaining the timing means and the control means in a powered-up state;

measuring the amount of elapsed time since the cartridge last received the printing command; and directing the cartridge to print at least one dot from each nozzle after a predetermined time has elapsed without receipt of a printing command.

2. The method of claim 1, wherein the control means comprises a microcontroller.

3. The method of claim 1, wherein the control means comprises a computer program.

4. The method of claim 1 wherein the control means comprises an assembly language program.

5. The method of claim 1, wherein the predetermined time is in the range of about thirty minutes to about three hours.

6. The method of claim 1, wherein the control means directs the cartridge to print about twenty dots from each nozzle.

7. The method of claim 1, further comprising the step that if a particular time less than the predetermined time has elapsed, directing the cartridge to print at least one dot from each nozzle as a priming dot.

8. The method of claim 7, wherein the number of priming dots printed from each nozzle is proportional to the ratio of the particular time to the predetermined time.

9. A method for priming an ink jet printer system having timing means for measuring time, a cartridge with at least one nozzle, and control means for controlling the cartridge by means of a printing command, comprising the steps of:

measuring the amount of elapsed time since the cartridge last received the printing command; and directing the cartridge to print at least one dot from at least the nozzle after a predetermined time has elapsed without receipt of the printing command.

10. A device for priming an ink jet printer system comprising:

a cartridge for printing dots with at least one nozzle;

control means for controlling the cartridge by means of a printing command; and timing means for measuring the amount of elapsed time since the cartridge last received the printing command;

wherein the control means comprises means for directing the cartridge to print at least one dot from each nozzle after a predetermined time has elapsed.

11. The device of claim 10, wherein the control means comprises a microcontroller.

12. The device of claim 10, wherein the control means comprises computer program means.

13. The device of claim 10, wherein the control means comprises an assembly language program.

14. The device of claim 10, wherein the predetermined time is in the range of about thirty minutes to about three hours.

15. The device of claim 10, wherein the control means comprises means for directing the cartridge to print about twenty dots from each nozzle.

16. The device of claim 10, wherein the control means comprises means for directing the cartridge to print at least one dot from each nozzle as a priming dot if a particular time less than the predetermined time has elapsed and the control means directs the cartridge to print.

17. The device of claim 16, wherein the number of priming dots printed from each nozzle is proportional to the ratio of the particular time to the predetermined time.

18. A device for priming an ink jet printer system comprising:

a cartridge for printing having at least one nozzle;

control means for controlling the cartridge by means of a printing command; and timing means for measuring the amount of elapsed time since the cartridge last received the printing command;

wherein the control means comprises means for directing the cartridge to print at least one dot from the nozzle after a predetermined time has elapsed.

* * * * *